United States Patent [19]

Hirai et al.

[11] Patent Number: 5,182,240

[45] Date of Patent: Jan. 26, 1993

[54] DIELECTRIC CERAMIC COMPOSITION OF $BAO$, $TIO_2$, $ND_2O_3$, $SM_2O_3$ AND $AL_2O_3$

[75] Inventors: Takami Hirai, Nishikamo; Shinsuke Yano, Nagoya, both of Japan

[73] Assignee: NGK Insulators, Ltd., Japan

[21] Appl. No.: 745,186

[22] Filed: Aug. 15, 1991

[30] Foreign Application Priority Data

Aug. 20, 1990 [JP] Japan ................................ 2-219717

[51] Int. Cl.$^5$ .............................................. C04B 35/46
[52] U.S. Cl. ..................................................... 501/139
[58] Field of Search ......................................... 501/139

[56] References Cited

U.S. PATENT DOCUMENTS

| | | | |
|---|---|---|---|
| 4,442,220 | 4/1984 | Ouchi et al. | 501/139 |
| 5,013,695 | 5/1991 | Kato et al. | 501/139 |

FOREIGN PATENT DOCUMENTS

| | | |
|---|---|---|
| 0222303 | 5/1987 | European Pat. Off. . |
| 56-102003 | 8/1981 | Japan . |
| 57-21010 | 2/1982 | Japan . |
| 58-20905 | 4/1983 | Japan . |
| 59-23048 | 5/1984 | Japan . |
| 64-41863 | 9/1986 | Japan . |
| 62-10096 | 1/1987 | Japan . |
| 1-227303 | 9/1989 | Japan . |

OTHER PUBLICATIONS

Chemical Abstracts, vol. 96, Columbus, Ohio, US; abstract No. 154048R, p. 777.
Patent Abstracts of Japan, vol. 13, No. 562 (C-665) Dec. 13, 1989 JP1234358.
Patent Abstracts of Japan, vol. 13, No. 184 (E-751) Apr. 28, 1989 JP1010504.

*Primary Examiner*—Mark L. Bell
*Assistant Examiner*—Deborah Jones
*Attorney, Agent, or Firm*—Parkhurst, Wendel and Rossi

[57] ABSTRACT

A dielectric ceramic composition is disclosed which consists principally of: barium oxide, titanium oxide, neodymium oxide and samarium oxide as major components which are represented by the following formula $xBaO - yTiO_2 - z[(1 - a)Nd_2O_3 - aSm_2O_3]$, where $0.10 \leq x \leq 0.20$, $0.60 \leq y \leq 0.75$, $0.10 \leq z \leq 0.25$, $x+y+z=1$, and $0 < a \leq 0.50$; and not larger than 2.5 parts by weight of alumina per 100 parts by weight of a total amount of the major components.

2 Claims, No Drawings

DIELECTRIC CERAMIC COMPOSITION OF BAO, TIO$_2$, ND$_2$O$_3$, SM$_2$O$_3$ AND AL$_2$O$_3$

BACKGROUND OF THE INVENTION

1. Field of the Invention

The present invention relates in general to a dielectric ceramic composition, particularly to a dielectric ceramic composition suitable for forming dielectric resonators, for example, which are used with microwave (high-frequency) devices.

2. Discussion of the Prior Art

Keeping pace with recent developments of various microwave devices such as pocket or portable telephones, there has been a growing demand for small-sized high-performance dielectric resonators used in such devices. In particular, a dielectric ceramic used to form such dielectric resonators is required to have the following physical and structural features;

(1) The dielectric ceramic should have a sufficiently high specific dielectric constant ($\epsilon r$), to reduce the size of a resonator when the resonator is operated at a given frequency.

(2) The dielectric ceramic should have a sufficiently high Q value, to reduce the transmission loss of the resonator formed of the dielectric ceramic.

(3) The temperature coefficient ($\tau f$) of the resonance frequency of the resonator formed of the dielectric ceramic should be sufficiently low, to minimize changes of the operating characteristics of the resonator with respect to temperature.

There have been known various dielectric ceramic compositions used for forming such dielectric resonators. For example, laid-open Publication No. 58-20905 of examined Japanese Patent Application discloses a dielectric ceramic composition whose major components consist of BaO and TiO$_2$, a portion of which may be substituted by another element or other elements. A dielectric ceramic formed of the disclosed composition has a relatively low dielectric constant of around 30 ~ 40, and a relatively low Q value. Another example of dielectric ceramic composition is disclosed in laid-open Publication No. 59-23048 of examined Japanese Patent Application, which has a composite perovskite structure such as Ba(Mg$_{1/3}$Ta$_{2/3}$)O$_3$. The dielectric ceramic formed of this composition has a relatively high Q value, but suffers from a relatively low dielectric constant of around 30 ~ 40.

There is also known a dielectric ceramic composition as disclosed in laid-open Publication 56-102003 of unexamined Japanese Patent Application, whose major components consist of BaO, TiO$_2$, Nd$_2$O$_3$ and Bi$_2$O$_3$. While this dielectric ceramic composition has a relatively high dielectric constant, the temperature coefficient of the resonance frequency of the resonator formed of this ceramic composition is undesirably high, making it difficult for the resonator to provide satisfactory operating characteristics. A further example of dielectric ceramic composition as disclosed in laid-open Publication No. 57-21010 of unexamined Japanese Patent Application, whose major components consist of BaO, TiO$_2$, Nd$_2$O$_3$ and Sm$_2$O$_3$, has a relatively high temperature coefficient of the resonance frequency, which causes some problems in practical use. Still another example of dielectric ceramic composition is disclosed in laid-open Publication No. 1-227303 of unexamined Japanese Patent Application, which contains BaO, TiO$_2$, Nd$_2$O$_3$ and Al$_2$O$_3$ as major components. The dielectric ceramic formed of this composition has a relatively low Q value resulting in an increase in the transmission loss of the obtained resonator, owing to the presence of Al$_2$O$_3$ in the composition.

SUMMARY OF THE INVENTION

The present invention was developed in the light of the prior art situations described above. It is accordingly an object of the present invention to provide a dielectric ceramic composition which has a sufficiently high dielectric constant and a sufficiently high Q value, and whose resonance frequency has a sufficiently low temperature coefficient.

The above object may be attained according to the principle of the present invention, which provides a dielectric ceramic composition which consists principally of: barium oxide, titanium oxide, neodymium oxide and samarium oxide as major components which are represented by the following formula xBaO - yTiO$_2$ - z[(1 - a)Nd$_2$O$_3$ - aSm$_2$O$_3$], where $0.10 \leq x \leq 0.20$, $0.60 \leq y \leq 0.75$, $0.10 \leq z \leq 0.25$, $x+y+z=1$, and $0 < a \leq 0.50$; and not more than 2.5 parts by weight of alumina per 100 parts by weight of a total amount of the major components.

The dielectric ceramic composition according to the present invention consists principally of barium oxide (BaO), titanium oxide (TiO$_2$), neodymium oxide (Nd$_2$O$_3$) and samarium oxide (Sm$_2$O$_3$), in respective specific amounts as indicated by the above formula. A dielectric ceramic body formed of the present composition exhibits excellent microwave dielectric properties as described below. Since the ceramic composition of this invention further comprises alumina (Al$_2$O$_3$) in a given suitable amount, the dielectric ceramic formed of the present composition is given a further increased Q value, and a sufficiently reduced temperature coefficient.

If the BaO content of the dielectric ceramic composition is smaller than 10 mole % ($x < 0.10$), the dielectric constant of the obtained dielectric ceramic is undesirably lowered. If the BaO content exceeds 20 mole % ($x > 0.20$), the dielectric ceramic suffers from an excessively high temperature coefficient of the resonance frequency. If the TiO$_2$ content of the dielectric ceramic composition is smaller than 60 mole % ($y < 0.60$), the Q value of the dielectric ceramic obtained is considerably deteriorated. If the TiO$_2$ content exceeds 75 mole % ($y > 0.75$), the temperature coefficient of the resonance frequency of the dielectric ceramic becomes excessively high.

If the total content of Nd$_2$O$_3$ and Sm$_2$O$_3$, i.e., the above-indicated term [(1-a)Nd$_2$O$_3$ - aSm$_2$O$_3$] is smaller than 10 mole % ($z < 0.10$), the resonance frequency of the dielectric ceramic has a comparatively high temperature coefficient. If the total content of Nd$_2$O$_3$ and Sm$_2$O$_3$ exceeds 25 mole % ($z > 0.25$), the sinterability of the dielectric ceramic is unfavorably deteriorated.

According to the present invention, Sm$_2$O$_3$ is used with Nd$_2$O$_3$ so as to substitute for a portion of Nd$_2$O$_3$, to thereby increase the Q value of the dielectric ceramic and lower the temperature coefficient of the same. It is particularly desirable to substitute at least 3 mole % ($a \geq 0.03$) of Sm$_2$O$_3$ for a portion of Nd$_2$O$_3$ so that the use of the samarium oxide gives sufficient effects as described above. However, if the amount of substitution of Sm$_2$O$_3$ for Nd$_2$O$_3$ exceeds 50 mole % ($a > 0.50$), the dielectric constant of the dielectric ceramic is lowered.

Further, since the cost of samarium oxide is comparatively high, the substituting amount of $Sm_2O_3$ should be practically kept lower than 50 mole % from an economical point of view.

The addition of $Al_2O_3$ to the present ceramic composition results in the increased Q value and lowered temperature coefficient of the dielectric ceramic formed of this composition. If the amount of addition of $Al_2O_3$ exceeds 2.5 parts by weight per 100 parts by weight of the major components described above, the Q value and dielectric constant of the dielectric ceramic are deteriorated or excessively lowered, whereby the ceramic body obtained is rendered unsuitable for practical use.

EXAMPLE

To further clarify the concept of the present invention, an example of the invention will be described. It is to be understood that the invention is not limited to the details of the illustrated example, but may be embodied with various alterations, modifications and improvements, which may occur to those skilled in the art, without departing from the scope of the invention defined in the appended claims.

Initially, the amounts of highly pure barium oxide, titanium oxide, neodymium oxide and samarium oxide were measured so as to give various mole proportions (x, y, z and a) as indicated in TABLES 1-A, 1-B and 2 below. The measured materials having each mole proportion were then wet-mixed with some pure water in a polyethylene pot mill using alumina balls. The thus obtained mixture was taken out of the pot mill, dried, and calcined in the air for two hours at 1000° C. Then, the calcined mixture was thrown back into the polyethylene pot mill using alumina balls, and wet-ground with some pure water added to the calcined mixture. Before the addition of the water, the weight of the calcined mixture was measured, and alumina was introduced into the pot mill along with the calcined mixture such that the alumina provides a given number of parts by weight as indicated in TABLES 1-A, 1-B and 2, per 100 parts by weight of the mixture. At the same time, 1% by weight of polyvinyl alcohol (PVA) was added as a binder, which was uniformly mixed with the calcined mixture in the form of a powder. The thus obtained mixture was then dried and passed through a 400 mesh sieve, whereby dielectric ceramic mixture powders Nos. 1–40 as indicated in TABLE 1-A, 1-B and 2 were prepared.

The thus prepared dielectric ceramic mixture powders were subjected to a press-forming operation under surface pressure of 1 ton/cm$^2$, to prepare respective samples of circular discs, each of which has a diameter of 20 mm and a thickness of 15mm. The samples were fired in air for two hours at a temperature of 1300°–1400° C. The fired samples were ground to a final size of 14mm diameter and 7 mm thickness.

The thus prepared samples (Nos. 1–40) of dielectric ceramic body in the form of discs were tested to measure the dielectric constant and the non-load Q value, according to Hakki & Coleman method. Also, the temperature coefficients ($\tau f$) of the resonance frequency of the samples over a range of $-25°$ C. to 75° C. were measured. The measured values are indicated in TABLE 1-A, 1-B and 2. The measurements were made over the frequency range of 2–5 GHz. The Q values indicated in the tables are converted equivalents at 3 GHz.

While alumina was added to the calcined mixture of the major components BaO, $TiO_2$, $Nd_2O_3$ and $Sm_2O_3$ in the illustrated example, alumina may be mixed with the major components so that all of these components are wet-mixed prior to calcination.

It will be understood from TABLES 1-A, 1-B and 2 that the dielectric ceramic bodies made of the compositions Nos. 1–23 and 27–34 according to the present invention had sufficiently high dielectric constants and Q values, and significantly lowered temperature coefficients ($\tau f$) of the resonance frequency. On the other hand, the comparative samples made of the compositions Nos. 24–26 and 35–38 were unsatisfactory in terms of at least one of the dielectric constant, Q value and temperature coefficient ($\tau f$). The comparative samples Nos. 39 and 40 could not be sintered.

It will be understood from the above description that the dielectric ceramic made of the dielectric ceramic composition according to the present invention has a sufficiently high dielectric constant, a sufficiently high Q value and a sufficiently low temperature coefficient of the resonance frequency. The present dielectric ceramic composition contains alumina in a predetermined suitable amount, whereby the Q value can be significantly increased while the temperature coefficient can be sufficiently lowered.

TABLE 1 - A

| No. | x | y | z | a | $Al_2O_3$* | Dielectric Constant | Q | $\tau f$ (ppm/°C.) |
|---|---|---|---|---|---|---|---|---|
| PRESENT INVENTION | | | | | | | | |
| 1 | 0.135 | 0.680 | 0.185 | 0.150 | 0.5 | 73 | 3960 | 16 |
| 2 | 0.135 | 0.680 | 0.185 | 0.150 | 1.0 | 70 | 3970 | 12 |
| 3 | 0.135 | 0.680 | 0.185 | 0.150 | 1.25 | 67 | 4030 | 7 |
| 4 | 0.135 | 0.680 | 0.185 | 0.150 | 1.5 | 66 | 4210 | 7 |
| 5 | 0.135 | 0.680 | 0.185 | 0.150 | 2.0 | 64 | 3090 | 11 |
| 6 | 0.135 | 0.675 | 0.190 | 0.150 | 0.5 | 71 | 3010 | 9 |
| 7 | 0.135 | 0.675 | 0.190 | 0.150 | 1.0 | 68 | 3930 | 4 |
| 8 | 0.135 | 0.675 | 0.190 | 0.150 | 1.25 | 67 | 4000 | 4 |
| 9 | 0.135 | 0.675 | 0.190 | 0.150 | 1.5 | 66 | 3750 | 7 |
| 10 | 0.135 | 0.675 | 0.190 | 0.150 | 2.0 | 63 | 2120 | −4 |
| 11 | 0.140 | 0.675 | 0.185 | 0.150 | 0.5 | 75 | 3540 | 14 |
| 12 | 0.140 | 0.675 | 0.185 | 0.150 | 1.0 | 71 | 3960 | 12 |
| 13 | 0.140 | 0.675 | 0.185 | 0.150 | 1.25 | 69 | 3970 | 9 |
| 14 | 0.140 | 0.675 | 0.185 | 0.150 | 1.5 | 68 | 4090 | 8 |
| 15 | 0.140 | 0.675 | 0.185 | 0.150 | 2.0 | 67 | 2280 | 7 |

*parts by weight

TABLE 1 - B

| No. | x | y | z | a | Al₂O₃* | Dielectric Constant | Q | τf (ppm/°C.) |
|---|---|---|---|---|---|---|---|---|
| PRESENT INVENTION | | | | | | | | |
| 16 | 0.145 | 0.675 | 0.180 | 0.150 | 0.5 | 79 | 3660 | 23 |
| 17 | 0.145 | 0.675 | 0.180 | 0.150 | 1.0 | 74 | 3820 | 17 |
| 18 | 0.145 | 0.675 | 0.180 | 0.150 | 1.25 | 73 | 3990 | 14 |
| 19 | 0.145 | 0.675 | 0.180 | 0.150 | 1.5 | 70 | 3950 | 12 |
| 20 | 0.145 | 0.675 | 0.180 | 0.150 | 2.0 | 68 | 3020 | 5 |
| 21 | 0.145 | 0.675 | 0.180 | 0.100 | 1.5 | 70 | 3740 | 16 |
| 22 | 0.145 | 0.675 | 0.180 | 0.100 | 1.7 | 67 | 3270 | 13 |
| 23 | 0.145 | 0.675 | 0.180 | 0.100 | 1.9 | 68 | 3790 | 12 |
| COMPARATIVE | | | | | | | | |
| 24 | 0.140 | 0.675 | 0.185 | 0.150 | 0.0 | 78 | 2810 | 32 |
| 25 | 0.140 | 0.675 | 0.185 | 0.150 | 3.0 | 64 | 1700 | 6 |
| 26 | 0.150 | 0.750 | 0.100 | 0.000 | 1.5 | 58 | 3900 | 60 |

*parts by weight

TABLE 2

| No. | x | y | z | a | Al₂O₃* | Dielectric Constant | Q | τf (ppm/°C.) |
|---|---|---|---|---|---|---|---|---|
| PRESENT INVENTION | | | | | | | | |
| 27 | 0.150 | 0.750 | 0.100 | 0.200 | 1.5 | 56 | 4120 | 38 |
| 28 | 0.100 | 0.750 | 0.150 | 0.200 | 1.5 | 60 | 4480 | 52 |
| 29 | 0.170 | 0.700 | 0.130 | 0.150 | 2.0 | 61 | 3200 | 49 |
| 30 | 0.150 | 0.710 | 0.140 | 0.200 | 2.0 | 62 | 3600 | 36 |
| 31 | 0.200 | 0.700 | 0.100 | 0.150 | 1.0 | 54 | 3750 | 42 |
| 32 | 0.125 | 0.750 | 0.125 | 0.200 | 1.5 | 61 | 4880 | 49 |
| 33 | 0.115 | 0.670 | 0.215 | 0.200 | 1.0 | 57 | 2710 | 3 |
| 34 | 0.125 | 0.695 | 0.180 | 0.200 | 1.0 | 63 | 4360 | 12 |
| COMPARATIVE | | | | | | | | |
| 35 | 0.220 | 0.650 | 0.150 | 0.200 | 1.0 | 71 | 2400 | 74 |
| 36 | 0.125 | 0.775 | 0.100 | 0.200 | 1.0 | 66 | 3900 | 162 |
| 37 | 0.175 | 0.740 | 0.085 | 0.200 | 1.0 | 52 | 3120 | 90 |
| 38 | 0.075 | 0.700 | 0.225 | 0.200 | 1.0 | 44 | 1760 | 93 |
| 39 | 0.120 | 0.620 | 0.260 | 0.100 | 1.0 | not sinterable | | |
| 40 | 0.190 | 0.590 | 0.220 | 0.200 | 1.0 | not sinterable | | |

*parts by weight

What is claimed is:

1. A dielectric ceramic composition consisting essentially of: barium oxide, titanium oxide, neodymium oxide and semarium oxide as major components which are represented by $xBaO - yTiO_2 - z[(1 - a)Nd_2O_3 - aSm_2O_3]$, where $0.10 \leq x \leq 0.20$, $0.60 \leq y \leq 0.75$, $0.10 \leq z \leq 0.25$, $x+y+z=1$, and $0 < a \leq 0.50$; and wherein alumina is present in an amount of not more than 2.5 parts by weight of alumina per 100 parts by weight of a total amount of said major components.

2. The composition of claim 1, wherein said major components comprise at least 3 mole % of said samarium oxide.